(12) United States Patent
Christie et al.

(10) Patent No.: US 7,165,135 B1
(45) Date of Patent: Jan. 16, 2007

(54) METHOD AND APPARATUS FOR CONTROLLING INTERRUPTS IN A SECURE EXECUTION MODE-CAPABLE PROCESSOR

(75) Inventors: David S. Christie, Austin, TX (US); Kevin J. McGrath, Los Gatos, CA (US); Geoffrey S. Strongin, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 446 days.

(21) Appl. No.: 10/419,122

(22) Filed: Apr. 18, 2003

Related U.S. Application Data

(60) Provisional application No. 60/373,571, filed on Apr. 18, 2002.

(51) Int. Cl.
*G06F 7/04* (2006.01)
(52) U.S. Cl. .......................................... 710/269; 726/26
(58) Field of Classification Search ................ 710/261, 710/269; 726/26
See application file for complete search history.

(56) References Cited

U.S. PATENT DOCUMENTS

| | | | | | |
|---|---|---|---|---|---|
| 5,339,437 | A | * | 8/1994 | Yuen ........................... | 710/261 |
| 5,513,349 | A | * | 4/1996 | Horiguchi et al. ........... | 710/260 |
| 5,530,932 | A | * | 6/1996 | Carmean et al. ............ | 713/324 |
| 5,596,755 | A | * | 1/1997 | Pletcher et al. ............. | 710/261 |
| 5,615,263 | A | * | 3/1997 | Takahashi .................... | 713/164 |
| 5,684,948 | A | * | 11/1997 | Johnson et al. .............. | 726/29 |
| 5,724,027 | A | * | 3/1998 | Shipman et al. ............. | 726/16 |
| 5,987,604 | A | | 11/1999 | Edrich | |
| 6,327,652 | B1 | | 12/2001 | England et al. | |
| 6,330,670 | B1 | | 12/2001 | England et al. | |
| 6,775,779 | B1 | * | 8/2004 | England et al. ............... | 726/26 |
| 6,854,046 | B1 | | 2/2005 | Evans et al. | |
| 2002/0002673 | A1 | | 1/2002 | Narin | |
| 2003/0140205 | A1 | * | 7/2003 | Dahan et al. ................ | 711/163 |
| 2003/0200402 | A1 | | 10/2003 | Willman et al. | |
| 2003/0200405 | A1 | | 10/2003 | Willman et al. | |

FOREIGN PATENT DOCUMENTS

EP    1 209 563 A2    11/2001

OTHER PUBLICATIONS

"Microsoft Scheme for PC Security Faces Flak", Merritt, *EE Times*, Issue 1227, Jul. 15, 2002.
U.S. Appl. No. 10/419,084.
U.S. Appl. No. 10/429,132.
U.S. Appl. No. 10/654,734.
U.S. Appl. No. 10/419,085.
U.S. Appl. No. 10/419,086.
U.S. Appl. No. 10/419,038.
U.S. Appl. No. 10/419,083.
U.S. Appl. No. 10/419,090.
U.S. Appl. No. 10/419,121.
U.S. Appl. No. 10/419,091.
U.S. Appl. No. 10/419,120.

* cited by examiner

*Primary Examiner*—Paul R. Myers
(74) *Attorney, Agent, or Firm*—Meyertons Hood Kivlin Kowert & Goetzel, P.C.; B. Noël Kivlin; Stephen J. Curran

(57) ABSTRACT

A method is provided for controlling interrupts in a secure execution mode-capable processor. The method includes detecting an interrupt and performing a predetermined routine in response to detecting the interrupt. The method further includes performing a second routine prior to performing the predetermined routine in response to detecting the interrupt depending upon whether the processor is operating in a secure execution mode.

9 Claims, 5 Drawing Sheets

METHOD AND APPARATUS FOR CONTROLLING INTERRUPTS IN A SECURE EXECUTION MODE-CAPABLE PROCESSOR

This application claims the benefit of U.S. Provisional Application No. 60/373,571 filed Apr. 18, 2002.

BACKGROUND OF THE INVENTION

1. Field of the Invention

This invention relates to computer systems employing secure execution mode-capable processors and, more particularly, to a method for controlling interrupts in secure execution mode-capable processors.

2. Description of the Related Art

Modern computer systems are revolutionizing the way people live. This is particularly true for system platforms including microprocessors employing the x86 system architecture. The openness of x86-based systems to a myriad of owner-installable third-party peripheral devices and applications has enabled a broad marketplace of hardware and software vendors that has fostered competition, innovation, and evolution. An example of such evolution is the now widespread use of the platform as a digital communication and media system of ever-increasing quality and capability. In concert with the Internet, these system platforms are clearly revolutionizing mass distribution of digital content, allowing on-demand access to newspapers, real-time weather conditions and radio stations from around the world, on-line banking and shopping, and audio and video-based entertainment.

Since the x86 platform is an open architecture, devices typically have vendor-supplied drivers which run in Kernel mode in order to access the devices, and certain software applications may include Kernel mode components. Thus, although the open architecture may have advantages and may still provide a large degree of protection against accidental interference of one application with another, the current architectural protection mechanisms may be exposed in this environment to unwanted manipulation.

Computer systems including microprocessors employing the x86 architecture include features designed to protect against applications interfering with each other. For example, x86-based operating systems rely on two features of the x86 Protected mode architecture to provide an environment where applications are isolated from each other, and critical operating system code and data is isolated from applications: 1) paged virtual memory, and 2) execution privilege level.

Paged virtual memory allows the Operating System (OS) to define a separate virtual address space for each application, and to selectively map individual pages of physical memory into each of those virtual address spaces through a set of address translation tables. This provides each application with its own private section of physical memory for code and data that may be inaccessible to other applications. The virtual memory mechanism may also allow the OS to selectively map pages of physical memory into multiple virtual address spaces, and to selectively designate such pages in virtual space as read-only. This shared mapping capability may also allow a copy of the OS Kernel itself to reside in each application's address space, and may likewise allow shared mappings of peripheral device access ports and associated device driver routines, thus providing applications with efficient access to OS services without requiring costly address space switches. But the OS portion of the address space necessarily includes system data areas that OS code must be able to modify, and which must still be protected from application code. The read-only designation may not provide proper protection for such areas.

The x86 architecture also defines four privilege levels, 0 through 3, which are assigned to regions of code by the OS and kept in code segment descriptors. Typically, the privilege level of currently executing code or procedure will be stored as the Current Privilege Level (CPL). Thus the privilege levels are commonly referred to as CPL0 through CPL3. Using these privilege levels, certain system resources are accessible only to code executing at the proper level. The paged virtual memory architecture may allow access to pages of virtual memory to be restricted by privilege level. Although four privilege levels are defined, only the CPL0 and CPL3 levels are typically used by mainstream operating systems because the paged virtual memory architecture does not distinguish CPL1 or CPL2 from CPL3. CPL0 is commonly referred to as Kernel mode and is the most privileged level, while CPL3 is commonly referred to as User mode and is the least privileged level. OS code and data are typically assigned to CPL0 while application code and data are assigned to CPL3. CPL0 execution privilege does not override read-only protection; the two attributes are independent. Code segment descriptors are used to assign these levels.

In addition to this memory protection, all processor control registers, including those that control virtual memory operation, are by architectural definition accessible only at CPL0. In addition, special control transfer instructions are typically required to switch execution from one segment to another, and hence to switch privilege levels. These instructions allow the OS to limit the targets of such control transfers to specific entry points in OS-controlled code, hence an application may not change privilege level without simultaneously handing control over to the OS.

The isolation of address spaces from each other, and of OS memory from applications, may be completely controlled by the contents of the virtual memory address translation tables. The translation tables define the virtual-to-physical page mappings that isolate one application's memory from another's, and also the read-only and privilege level attributes that protect shared libraries and the OS. The tables themselves are memory-resident data structures, and contain translation entries that map them into the shared OS memory area and restrict access to them to Kernel mode code.

The existing protection mechanisms would seem to provide adequate protection for applications and the operating system. In a well-behaved system, (e.g. correct application of these mechanisms by the operating system, and correct operation of the OS code that controls these mechanisms, and that all other code which runs in Kernel mode does not interfere with this) they do. However, typical x86-based systems include such a large amount of Kernel-mode code, not just from the OS vendors but from many independent sources, that it may be impossible for anyone to assure that such interference, whether accidental or otherwise cannot occur. Further, it is possible that operational modes such as the System Management Mode (SMM) that bypass the virtual memory protection mechanisms and access system memory directly may compromise sensitive system data.

Depending on the type of operation that a user is performing and the type of software application that is running, information stored within or running on the computer system may be vulnerable to outside access. Thus, it may be desirable to improve security and thereby possibly make x86 architecture systems less vulnerable to such access.

SUMMARY OF THE INVENTION

Various embodiments of a method for controlling interrupts in a secure execution mode-capable processor are disclosed. In one embodiment, the method may include detecting an interrupt and performing a predetermined routine in response to detecting the interrupt. The method may further include performing a second routine prior to performing the predetermined routine in response to detecting the interrupt depending upon whether the processor is operating in a secure execution mode.

In one specific implementation, the interrupt may be an SMI interrupt. In such an implementation, the second routine may include saving trusted internal processor state using a trusted memory area.

Figure 1:
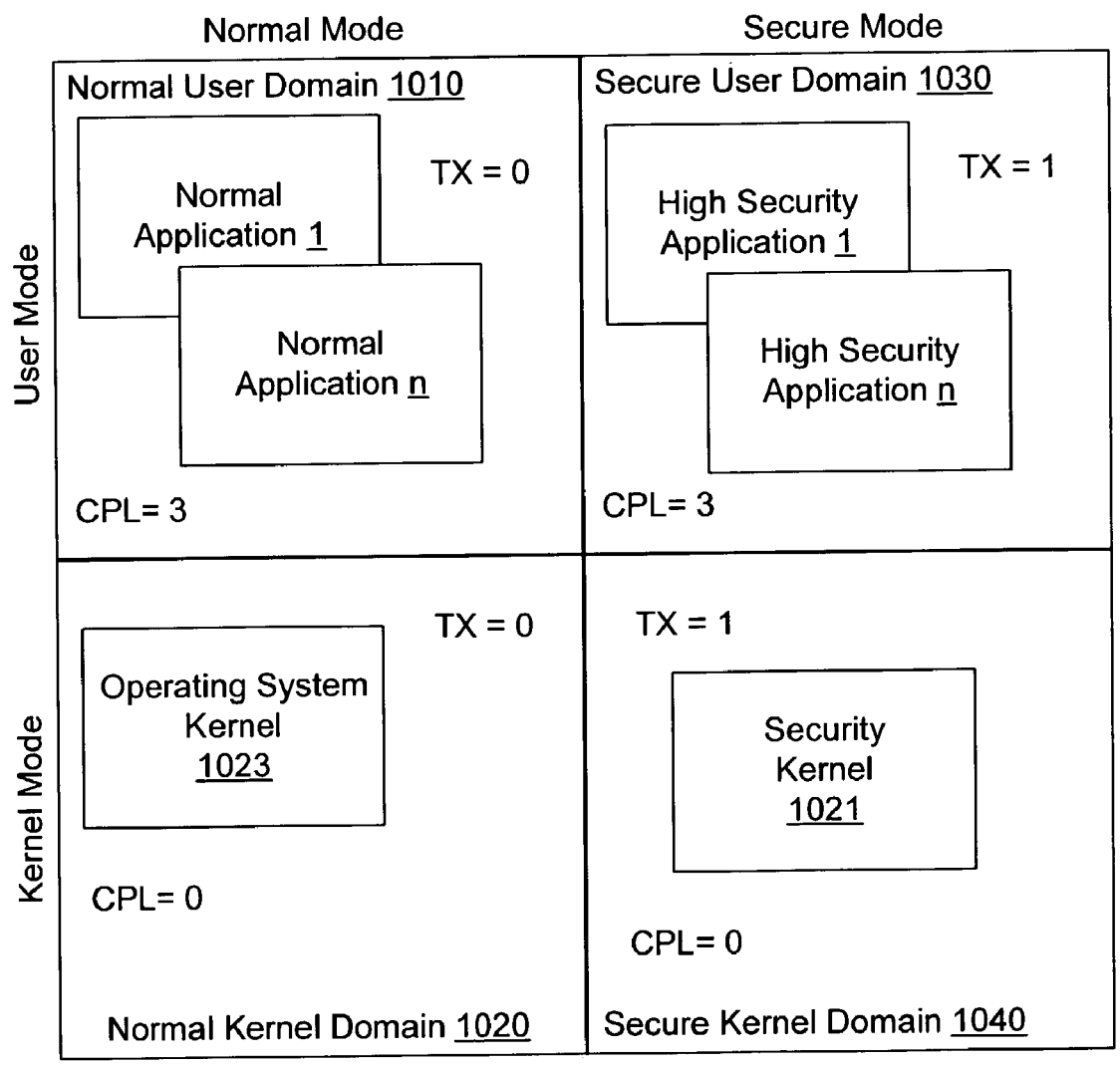
FIG. 1 is a diagram illustrating the operational domains of one embodiment of a secure execution mode-capable processor and the behavior of code operating in those domains.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Overview of a Secure Computing Platform

Trusted computing enables computer system (e.g., personal computer (PC)) users to participate in new activities such as downloading electronic cash and movies while at the same time being protected from attacks on their privacy. To be part of a trusted computing environment, the PC itself must be trusted by both the user and outside entities such as banks and content providers, for example. Critical elements which may be necessary to create a trusted PC include: a trusted processing environment, platform-specific secrets, cryptographic processing, secure storage and a secure operating system code segment referred to as a Security Kernel (SK). The building blocks to implement these elements will be described in greater detail below.

Processors configured to execute x86 instructions generally include architectural features such as Protected mode, which provides for paged virtual memory and privileged execution modes, and the set of control registers which controls these features. Controlling access to those control registers and page tables may provide additional protection from unauthorized access to program code and data within a computer system. Thus, adding a set of architectural extensions to such processors and corresponding software support may provide this protection. The overall security enhancements to a processor may be referred to as a Secure Execution Mode (SEM). Secure Execution Mode (SEM) is a new operating mode added to a processor that creates a trusted execution environment in which a Security Kernel can run free from external tampering.

Accordingly, a processor capable of operating in SEM may include security hardware which, when enabled by SEM, provides support for SEM operating modes such as a trusted execution (TX) mode of operation, for example. As will be described further below, the trusted execution mode may include, depending on what software is executing and its privilege level, the SEM-capable processor operating in a secure user mode and a secure kernel mode in addition to the normal user mode and normal kernel mode. Mechanisms may also be provided to create a protected memory region that may only be accessible by software running within this environment and to prevent certain hardware memory accesses (e.g., direct memory access (DMA)).

The new Trusted Execution environment (TX) is somewhat analogous to the traditional normal/protected mode (CPL3/CPL0) mechanism used to separate User and Kernel environments. As described in greater detail below in conjunction with the description of FIG. 1, the combination of User/Kernel modes with trusted/non-trusted modes creates a four-quadrant model. Thus, an SEM-capable CPU contains the hardware mechanisms that create and enforce the TX mode.

Turning now to FIG. 1, a diagram illustrating the operational domains of one embodiment of a secure execution mode-capable processor and the behavior of code operating in those domains is shown. As described above, current x86-based operating systems typically use two of the four available privilege levels (e.g., CPL0 and CPL3) to implement two modes within a normal execution mode or protection domain: Normal Kernel Mode and Normal User Mode. The SEM enhancements, when SEM is enabled, define a new execution mode which is referred to as trusted execution (TX) mode. When combined with the existing normal execution mode protection domains, TX mode creates the four distinct modes or software operational domains described below. In the illustrated embodiment, the four domains are normal user (NU) domain 1010, normal kernel (NK) domain 1020, secure user (SU) domain 1030 and secure kernel (SK) domain 1040. It is noted that as used herein, secure execution mode refers to any mode of processor execution during which SEM is enabled, irrespective of whether the processor is operating in TX mode. It is further noted that as used herein, non-secure execution mode refers to any mode of processor execution during which SEM is disabled.

The NU 1010 domain may be characterized by a processor running in normal user mode (i.e. CPL=3) and not in trusted execution (TX) mode. In the NU 1010 domain, typical virtual memory settings allow for normal operation of unmodified applications. Under SEM, such applications are however prevented from accessing the memory of applications residing in the SU domain 1030, or the memory containing Security Kernel 1021 in the SK domain 1040. Further, such applications are prevented from accessing the memory of the OS Kernel 1023 or device drivers in the Normal Kernel domain 1020 by existing protection logic mechanisms such as U/S and R/W page attributes for example (not shown).

In the NK domain 1020, SEM allows for normal operation of unmodified OS Kernel 1023 components and kernel-mode device drivers. Code executing in this domain may access objects in the NU domain 1010, but is prevented under SEM from accessing objects in either the SU domain 1030 or the SK domain 1040. Further, the NK domain 1020 may be characterized by a processor running in Normal Kernel mode (i.e. CPL=0) but not in TX mode. When paging is enabled in the NK domain 1020, a processor may sometimes be referred to as operating in a Native kernel mode.

In the SU domain 1040, SEM may allow a new type of application software such as high security application (HSA) 1, for example to run. HSA software may be prevented from accessing objects in any other domain by existing x86 page protection and page mapping mechanisms. In addition, the HSAs are protected from unauthorized access by any code executing in the NU domain 1010 and the NK domain 1020, including the operating system kernel 1023 and device drivers (not shown in FIG. 1). As will be described in greater detail below, Security Kernel 1021 may be responsible for setting up and maintaining the virtual address spaces of HSAs. Further, the SU domain 1040 may be characterized by a processor running in User mode (i.e. CPL=3) but also in TX mode, which may also be referred to as a secure user mode.

In the SK domain 1040, SEM may allow Security Kernel 1021 full access to all platform resources and in addition may give exclusive control of those resources to Security Kernel 1021. The SK domain 1040 may be characterized by a processor running in Kernel mode (i.e. CPL=0) and also in TX mode, which may also be referred to as a secure kernel mode.

Generally speaking, Security Kernel 1021 is software which runs in the trusted execution (TX) mode. In one embodiment, Security Kernel 1021 may be the only software that runs in SK domain 1040. In SK domain 1040, security kernel 1021 may control all virtual-to-physical memory mappings, and may control what areas of physical memory are accessible to external devices. However, Security Kernel 1021 may rely on the OS kernel's process creation functions, including normal mode virtual memory mappings, initial mapping of HSA memory and loading of HSA code and data sections. Security Kernel 1021 may however monitor every such mapping to ensure that there is no unauthorized mapping of trusted memory into untrusted virtual spaces. Thus, Security Kernel 1021 may regard all areas of memory that are not trusted as untrusted. Further, Security Kernel 1021 may regard all running program code that is not controlled by Security Kernel 1021 to be untrusted. It is noted that in one embodiment, Security Kernel 1021 may be a stand-alone code segment which may be a patch to an existing OS. In alternative embodiments, Security Kernel 1021 may be a module or code segment within and part of a given OS.

Major functions of SEM include placing the system in the trusted environment by initializing the processor to run in SEM, verifying the authenticity of the SK, and protecting the trusted environment from outside attacks. It is noted that the terms CPU, microprocessor and processor may be used interchangeably. Thus, one of the main features of SEM is that SEM protections may be reliably enabled after the system is up and running. In one embodiment, there may be no requirement to change the typical x86 platform boot process. SEM protections may typically be turned on by a system software component that, for the purposes of this document, is referred to as an SEM driver (not shown). The SEM driver may be independent from the OS kernel, but run in kernel mode, much like any device driver. The SEM driver may launch the SKINIT instruction, thereby initializing the SK as described further below.

Central to creating a trusted PC is a unique, platform specific, secret. In practice, this secret may be the private half of a public/private cryptographic key pair. The secret must only be used when the PC is operating within the trusted environment, and it must never be revealed to anyone—or any code. The results of cryptographic operations using the secret can be revealed, but not the secret itself. For this to work, the secret and the cryptographic processing machinery that uses it must exist in a closed box with controlled inputs and outputs. In practical terms, a closed box refers to a single integrated circuit (IC) package that combines processing capability and nonvolatile storage. This device is referred to as a Security Services Processor (SSP). In one embodiment, at least one SSP is required and exactly one SSP participates in the platform initialization process.

Architecturally, the SSP may be located anywhere in the platform. The only requirement is that a non-spoofable and secure communication path exist between the SEM-capable processor and the SSP. As used herein, a non-spoofable communication path between the SEM-capable processor and the SSP refers to a secure communication path in which the SSP does not receive commands from either software executing outside of the trusted environment or from DMA hardware. This may be especially complicated when the trusted environment is being initialized. Here, the SSP must verify the validity of the SK and be certain that the SK that is being validated is actually the code running at that instant on the SEM-capable processor. The validation takes the form of a cryptographic hash of the SK image. This hash must be delivered to the SSP in a manner that could not have resulted from the operation of normal software. Further, the SEM-capable processor must begin execution of the SK from a clean initialization state (and the SSP must know this). These requirements may be met by using CPU microcode and hardware mechanisms that are unavailable to normal software. A specific feature of the SEM-capable processor, the Security Kernel Initialization (SKINIT) instruction, is used to perform various security initialization functions such as reinitializing the SEM-capable processor, verifying that other processors in an MP system are stopped, and communicating with the SSP using reserved system addresses and unique bus transactions and jumping into the SK code, for example. It is noted that in one embodiment, the SKINIT instruction is a single instruction having multiple microcode components that execute atomically. As used herein, to execute atomically refers to executing to completion in a specified order without interruption. It is further noted that in one embodiment, the initialization process includes two steps: the validation of a small Secure Loader (SL) by the SSP, followed by the validation of the much larger SK.

Computer Systems Employing a Trusted Computing Platform

Figure 2:
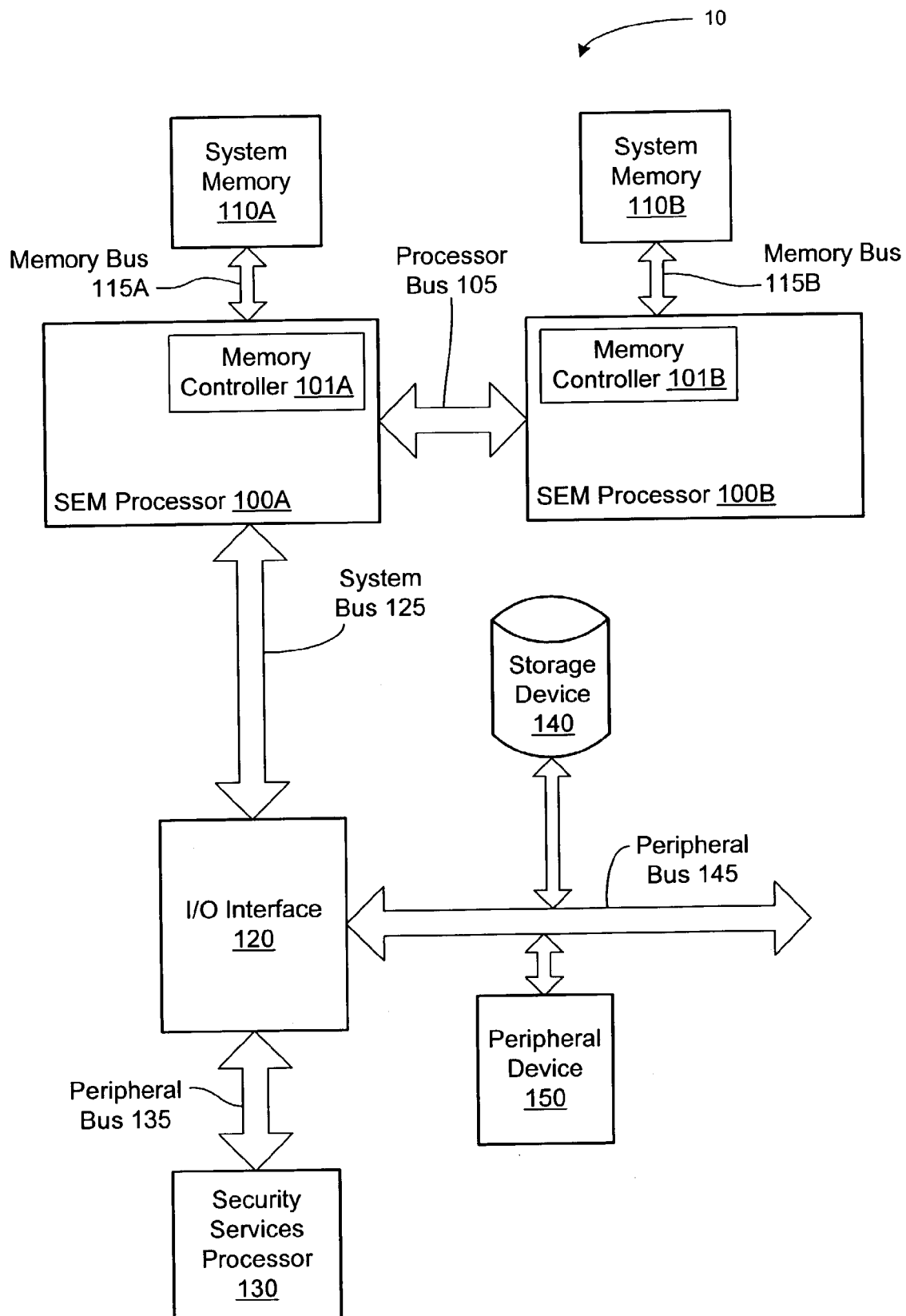
FIG. 2 is a block diagram illustrating one embodiment of a computer system employing a trusted computing platform.

Referring to FIG. 2, a block diagram of one embodiment of a computer system employing a trusted computing platform is shown. Computer system 10 includes two SEM capable processors designated SEM processor 100A and SEM processor 100B. SEM processor 100A is coupled to SEM processor 100B via a processor bus 105. Computer system 10 also includes a system memory 110A which is coupled to SEM processor 100A and a system memory 110B which is coupled to SEM processor 100B. SEM processor 100A is coupled to an I/O interface 120 via a system bus 125. It is noted that in alternative embodiments, system memories 110 may be connected to I/O interface 120. I/O interface 120 is coupled to a storage device 140 and to a peripheral device 150 via a peripheral bus 145. I/O interface 120 is further coupled to SSP 130 via peripheral bus 135. In an alternative embodiment, instead of peripheral bus 135, SSP 130 may be coupled to peripheral bus 145. It is noted that although two SEM processors are shown, other embodiments may include other numbers of SEM processors. It is also noted that components having the same reference number and a letter may be referred simply to by the reference number alone. For example, SEM processor 100A may be referred to simply as SEM processor 100 where appropriate.

SEM processor 100 is illustrative of a processor employing the x86 architecture. For example, in one embodiment, SEM processor 100 may be an Athlon™ processor by Advanced Micro Devices, Inc. As such, SEM processor 100 is configured to execute x86 instructions which may be stored in system memory 110 or storage device 140. In the illustrated embodiment, SEM processor 100 may include security hardware (not shown in FIG. 2) that, when enabled by SEM, provides support for SEM operating modes such as the trusted execution (TX) mode described above in conjunction with the description of FIG. 1, for example.

In the illustrated embodiment, SEM processor 100A and SEM processor 100A each include an integrated memory controller designated memory controller 101A and 101B, each manufactured on the same integrated circuit as its respective SEM processor 100A and 100B. It is noted that in other embodiments, memory controller 101 may be manufactured on a separate integrated circuit and coupled to SEM processor 100 as a north bridge.

System memory 110 is configured to store program instructions and data that is frequently used by SEM processor 100. In a typical system configuration, storage device 140 may be used to more permanently store the program instructions and data and as SEM processor 100 needs the data and program code, it may be transferred to system memory 110. Additional support for SEM operating modes may be provided by the security kernel which may be executed in conjunction with the OS out of system memory 110 during operation of SEM processor 100. In addition, system memory 110 may be partitioned into a trusted portion and an untrusted portion. The security kernel resides in the trusted portion of system memory 110. As described above, system memory 110 is typically accessed using paged virtual memory. In such an arrangement, physical addresses in system memory 110 may be accessed by individual pages or chunks of memory. This paging function is typically handled by OS memory management functions.

In one embodiment, system memory 110 may be implemented using a plurality of memory chips implemented in dynamic random access memory (DRAM) technology or in one of the varieties of DRAM technologies available, such as synchronous DRAM (SDRAM), for example. The DRAM chips are typically mounted on small circuit boards having an edge connector which are inserted into a socket connector on a motherboard. Depending on the configuration of the boards, they may be referred to as either single or dual in-line memory modules (e.g. SIMMs or DIMMs, respectively). System memory 110 may include multiple banks of memory modules which may allow memory expansion.

As described above, storage device 140 may store program code and data. In one embodiment, storage device 140 may be a hard disk drive or a bank of hard disk drives, although other embodiments are contemplated that include other mass storage devices such as CD-ROM drives, floppy disk drives and tape drives, for example.

Peripheral device 150 may be any peripheral device such as a modem, video capture device or other general purpose input output device, for example. It is noted that in other embodiments, other numbers of peripheral devices may be used.

I/O interface 120 may be configured to provide bus control and translation for transactions between different peripheral buses and SEM processors 100A and 100B during normal system operation. In one embodiment, I/O interface 120 may perform functions associated with a north bridge. For example, peripheral bus 145 may be a peripheral component interconnect (PCI) bus and peripheral bus 135 may be a low pin count (LPC) bus. In addition, I/O interface 120 may be configured to determine whether an SSP is connected to it and to which bus and to allow non-spoofable communication to occur between SEM processor 100 and SSP 130 during a secure initialization. I/O interface 120 may also be configured to recognize SKINIT related messages and transport those messages to SSP 130 in the specific format of peripheral bus 135.

Overview of System Management Mode (SMM) and INIT

X86-based computer systems, such as computer system 10, generally provide for specialized device management software to execute beyond the scope of the Operating System, transparently to the OS kernel and applications. In one embodiment, this mode of operation may for example enable computer system 10 to save and restore its internal processor state, such as the contents of various registers, using external memory or disk in preparation for entering a power-saving suspended state. This mode of operation is referred to as System Management Mode (SMM).

SMM generally makes use of a small region of hidden SMM memory, which only becomes active when the processor enters SMM in response to a System Management Interrupt (SMI). In one embodiment, SMM memory may be a region of system memory 110, while in another embodiment SMM memory may be located in a memory (not shown) separate from system memory 110. A conventional processor unconditionally enters SMM in response to an SMI assertion, suspending whatever was executing prior to the SMI assertion. Upon entry to SMM, virtual memory paging and Protected mode are disabled. Using physical memory addresses, essential internal processor state including, for example, general purpose register file contents, is then stored in a special area of SMM memory called the State Save Map (SSM), which is also referred to as the SMM Save Area. Once the internal processor state is saved, execution of the SMI handler instruction sequence commences; this may put the processor in a suspended state, or take any number of other actions, including reading or writing any memory location or I/O port, for example. To resume normal operation, SMM is exited via an RSM instruction called by the SMI handler. Executing the RSM instruction causes the data in the State Save Map to be read and causes the internal computing state to be restored.

In conventional processors there is no provision for the OS kernel to disable SMI; it may assert and cause execution to switch to SMM at any time. This operation may pose security issues in a trusted computing environment. In particular, if an SMI assertion were to occur while an SEM-capable processor is processing secure information in trusted execution mode, such secure information could be compromised when trusted execution mode internal processor state is saved during SMM operation.

Like the SMI interrupt described above, the INIT interrupt also poses security concerns in a trusted computing environment. The INIT interrupt is similar to SMI because the INIT interrupt interrupts the processor after completion of the current instruction and causes an unconditional control transfer to an interrupt handling routine. In a conventional processor, the INIT interrupt reinitializes certain internal processor state such as control registers, segment registers and general purpose registers in a manner similar to an assertion of the processor's RESET signal. However, the INIT interrupt does not alter the contents of Model Specific Registers (MSRs), caches or numeric coprocessor state. Following reinitialization of the relevant processor state, the INIT interrupt then transfers control to the same instruction address as RESET (physical address FFFFFFF0h).

In one embodiment, memory controller 101 may include hardware (not shown) that may clear trusted memory pages in response to a RESET assertion. However, the INIT interrupt may not be visible to memory controller 101, and hence may not clear trusted memory pages prior to transferring control to physical address FFFFFFF0h. This may present a security risk by potentially exposing trusted memory pages to the code that executes following the INIT interrupt.

Interrupt Redirection Hardware Support

As will be described in greater detail below in conjunction with the descriptions of FIG. 3 through FIG. 5, in one embodiment SEM processor 100 includes hardware (not shown in FIG. 2) that may redirect interrupts such as SMI and INIT into a security exception (SX) when SEM processor 100 is operating with SEM enabled, thereby allowing the security kernel (SK) to intervene and secure trusted data before the redirected interrupt is processed. It is noted that the conventional execution behavior of a processor in response to an interrupt is referred to herein as a predetermined routine. It is further noted that as used herein, redirection of an interrupt refers to the process whereby exception handling logic (not shown in FIG. 2) detects an interrupt to be redirected, and rather than immediately responding to the detected interrupt, instead may retain the detected interrupt as pending, generate a second routine such as by issuing a security exception, for example, and cause execution logic (not shown in FIG. 2) to begin processing the second routine prior to or instead of the predetermined routine.

Generally speaking, a security exception is an exception that when generated, may be handled by the Interrupt Descriptor Table (IDT) mechanism using a predetermined interrupt vector or by other exception handling logic that transfers control directly to the SK. For example, in one embodiment, if SEM processor 100 is operating in Native kernel mode or normal kernel mode when a security exception is generated, the SK may directly handle the security exception. Alternatively, if SEM processor 100 is operating in a user mode such as normal user mode, a security exception may be generated and the IDT mechanism may handle the security exception as it would any other IDT-based exception, using a predetermined interrupt vector specific to the security exception. The IDT mechanism may then pass the exception to the OS kernel mode handler for that vector, which may in turn pass the exception to the SK using whatever software conventions may be employed for OS communication with the SK.

Figure 3:
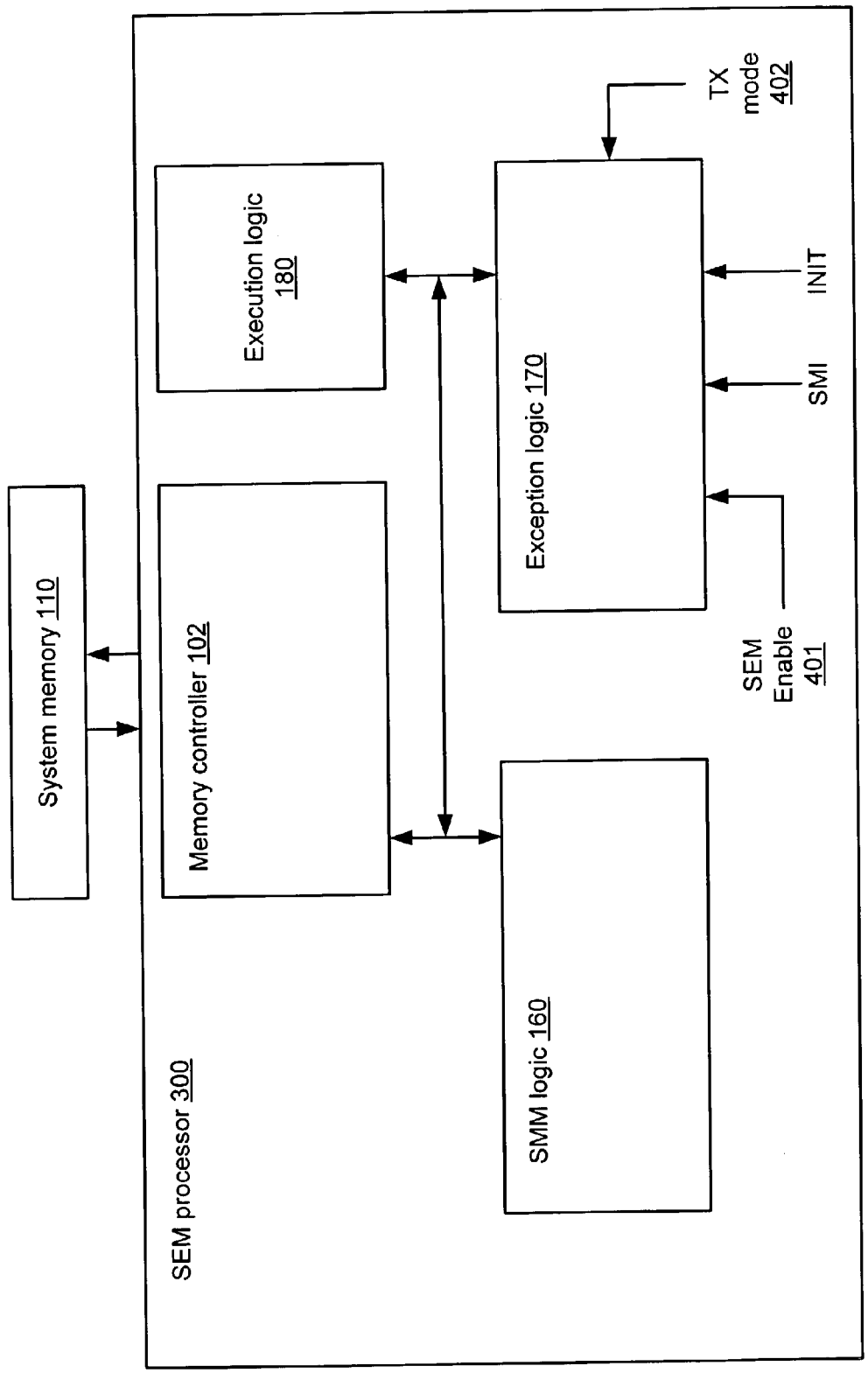
FIG. 3 is a block diagram illustrating one embodiment of a secure execution mode processor.

Turning to FIG. 3, a block diagram of one embodiment of an SEM processor and a system memory is shown. SEM processor 300 includes a memory controller 102, SMM logic 160, exception logic 170, and execution logic 180, interconnected to one another via a variety of interconnect mechanisms. It is noted that SEM processor 300 may be illustrative of SEM processor 100A or 100B of FIG. 2 and memory controller 102 may be illustrative of memory controller 101 of FIG. 2. In one embodiment, memory controller 102 may be configured to process access requests to system memory 110 originating from execution logic 180 or SMM logic 160. Memory controller 102 may further be configured to process access requests for exception processing from exception logic 170 and to send exception information corresponding to access requests to exception logic 170. Execution logic 180 may be configured to execute code in a pipelined fashion.

In one embodiment, exception logic 170 is coupled to receive interrupt signals SMI and INIT that may be indicative that a respective interrupt has been requested. Exception logic 170 may be coupled to receive a TX mode signal 402 that may be indicative that the processor is in TX mode. In one embodiment, TX enable signal 402 may be derived from a TX enable bit in a designated control register not visible to software (not shown). The TX enable bit may be asserted upon entry into TX mode and deasserted upon exit from TX mode; however, other embodiments are contemplated in which TX mode may be indicated differently. Redirection of interrupts in exception logic 170 may be enabled and disabled depending on the state of a SEM enable signal 401, although other embodiments are contemplated in which such redirection may be enabled differently. In one embodiment, SEM enable signal 401 may be derived from an SEM enable flag (not shown) in a designated control register or a model specific register that may be asserted during a secure initialization process.

In one embodiment, when SEM enable signal 401 indicates that SEM processor 300 is in a secure execution mode, TX mode 402 indicates that SEM processor 300 is in TX mode, and an SMI or INIT interrupt is received, exception logic 170 may redirect the received interrupt to a security exception as described in greater detail below in conjunction with the description of FIG. 4 and FIG. 5. In one embodiment, exception logic 170 may be further configured to convey an indication of the type of interrupt that was redirected, for example SMI or INIT, in an exception frame (not shown) generated on the system stack in response to the processing of the security exception by execution logic 180. In another embodiment, exception logic 170 may be configured to store an indication of the redirected interrupt type in a status storage such as a register, for example (not shown).

Figure 4:
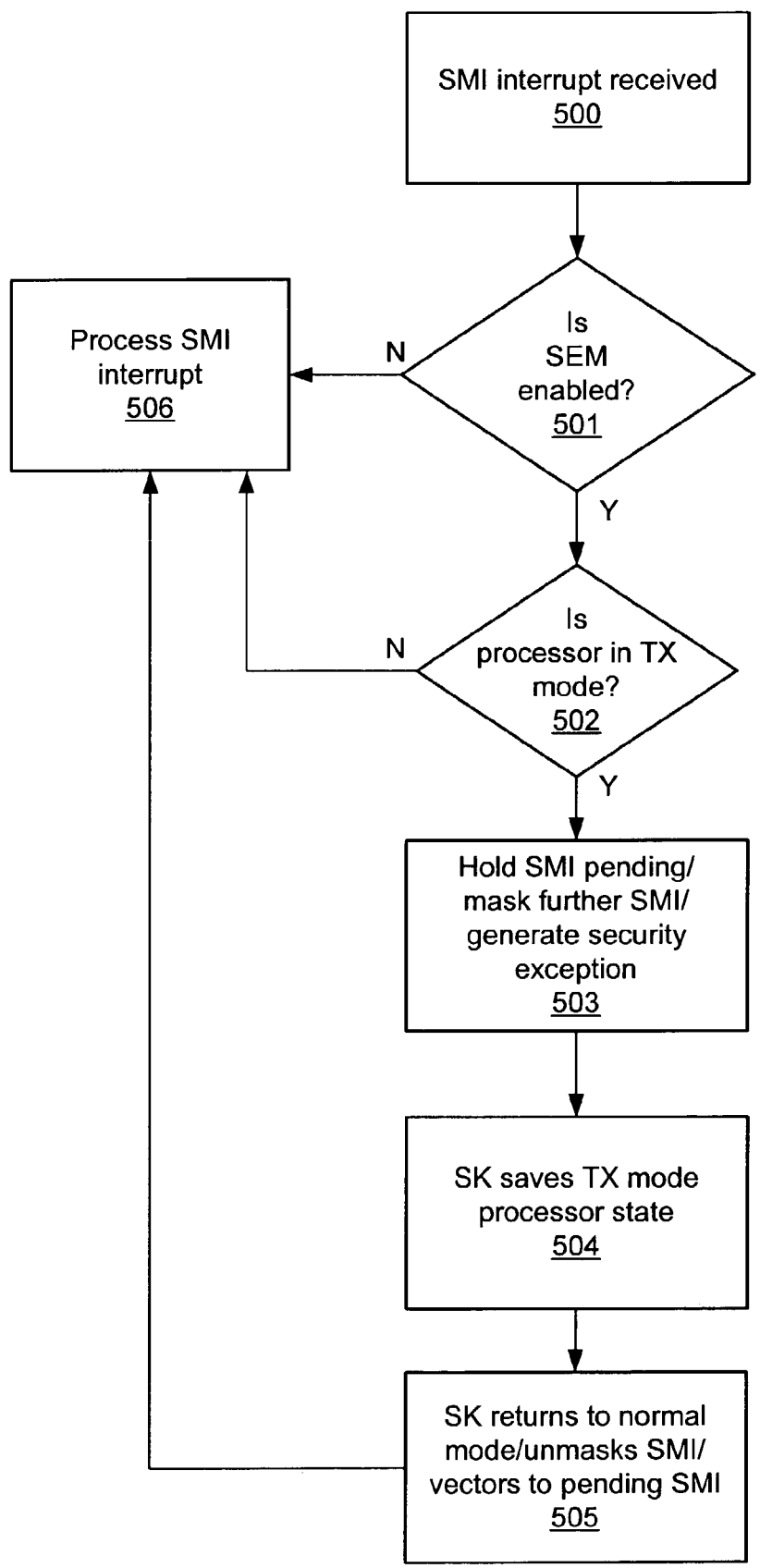
FIG. 4 is a flow diagram illustrating the operation of one embodiment of exception logic during an SMI interrupt in a trusted computing platform.

FIG. 4 illustrates a flow diagram describing the operation of one embodiment of exception logic during an SMI interrupt in a trusted computing platform. Referring collectively to FIG. 1 through FIG. 4, operation begins in block 500 where an SMI interrupt is detected by exception logic 170. Based on the status of SEM enable 401, exception logic 170 determines whether the SEM features of SEM processor 300 are enabled (block 501). If SEM features are not enabled, exception logic 170 allows the normal processing of the SMI to proceed, whereby SEM processor 300 enters SMM (block 506).

Returning to block 501, if SEM features are enabled, exception logic 170 determines whether SEM processor 300 is in TX mode based on the status of TX mode signal 402 (block 502). If SEM processor 300 is not in TX mode, exception logic 170 allows the normal processing of the SMI to proceed, whereby SEM processor 300 enters SMM (block 506).

Returning to block 502, if SEM processor 300 is in TX mode, exception logic 170 may hold the detected SMI interrupt in a pending state, mask further SMI interrupts from being detected, generate a security exception, and cause execution logic 180 to begin processing the security exception. In one embodiment, execution logic 180 may create an exception frame (not shown) on the system stack including information corresponding to the security exception, for example, an indication that the source of the security exception is an SMI interrupt. Execution logic 180 may then transfer execution control to the SK (block 503).

In one embodiment, when the SK receives the security exception for processing, it may store the TX mode internal processor state of SEM processor 300 to a trusted memory area (block 504). Once the TX mode processor state has been stored, the SK may return execution control back to the normal kernel mode. Exception logic 170 may detect the transition of SEM processor 300 from TX mode to normal kernel mode, unmask SMI interrupts, and cause execution logic 180 to vector to the pending SMI interrupt (block 505). Processing of the SMI then proceeds in normal kernel mode, whereby SEM processor 300 enters SMM with the SEM protections described above still enabled (block 506).

Figure 5:
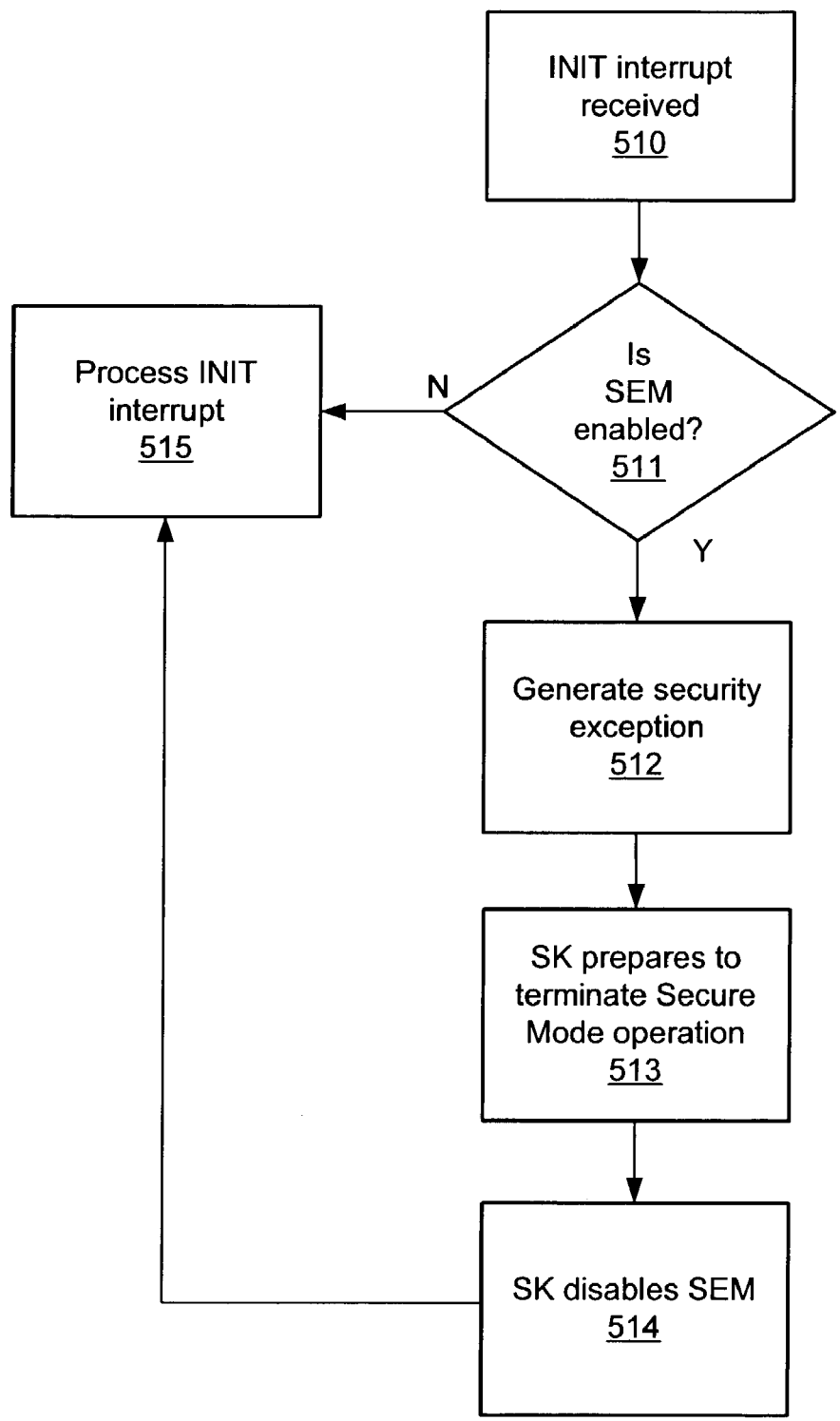
FIG. 5 is a flow diagram illustrating the operation of one embodiment of exception logic during an INIT interrupt in a trusted computing platform.

FIG. 5 illustrates a flow diagram describing the operation of one embodiment of exception logic during an INIT interrupt in a trusted computing platform. Generally speaking, the flow of redirection for INIT is similar to SMI. However, unlike SMI, INIT does not resume the state of execution occurring at the time the INIT occurs. Rather, as described above, INIT reinitializes a significant amount of internal processor state and then unconditionally transfers control to the same instruction address as RESET. Moreover, as described above, trusted memory pages may not automatically be cleared for INIT as for RESET. Due to this behavior, a trusted execution model may assume that SEM features, if enabled, will be disabled prior to INIT execution and enabled again if desired after execution begins from the RESET address. Additionally, a trusted execution model may assume that trusted memory is cleared by trusted software prior to an INIT. Thus, as described in more detail below, INIT may be redirected irrespective of whether SEM processor 300 is in TX mode.

Referring collectively to FIG. 1 through FIG. 3 and FIG. 5, operation begins in block 510 where an INIT interrupt is detected by exception logic 170. Based on the status of SEM enable 401, exception logic 170 determines whether the SEM features of SEM processor 300 are enabled (block 511). If SEM features are not enabled, exception logic 170 allows the normal processing of the INIT interrupt to proceed as described above (block 515).

Returning to block 511, if SEM features are enabled, exception logic 170 may generate a security exception and cause execution logic 180 to begin processing the security exception. In one embodiment, execution logic 180 may create an exception frame (not shown) on the system stack including information corresponding to the security exception, for example, an indication that the source of the security exception is an INIT interrupt. Execution logic 180 may then transfer execution control to the SK (block 512).

In one embodiment, when the SK receives the security exception for processing, it may detect that the security exception was caused by a redirected INIT interrupt. Depending on the SK implementation, the SK may then take whatever steps are necessary to safely terminate secure execution mode operation, including clearing sensitive data in trusted memory areas (block 513). Once the SK has completed preparations to terminate secure execution mode operation, it may disable SEM features. In one embodiment, SEM features may be disabled by deasserting an SEM enable flag (not shown) in a designated control register or a model specific register (block 514). Once SEM features are disabled, the SK may cause the INIT interrupt to be reissued and normal processing of INIT proceeds as described above (block 515).

In the foregoing discussion, the term "asserted" refers to a logic 1 value, and the term "deasserted" refers to a logic 0 value. However, in other embodiments, it is contemplated that these values may be reversed for any given bit.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for controlling interrupts in a secure execution mode-capable processor, said method comprising:
   detecting an interrupt;
   performing a predetermined routine in response to detecting said interrupt; and
   performing a second routine prior to performing said predetermined routine in response to detecting said interrupt is an INIT interrupt depending upon whether processor features associated with a secure execution mode are enabled;
   wherein in response to detecting said interrupt is an INIT interrupt, and determining that said secure execution mode features are enabled, clearing a trusted memory area, and disabling the secure execution mode features.

2. The method as recited in claim 1, wherein said second routine includes calling a secure exception handler.

3. The method as recited in claim 2, wherein calling said secure exception handler includes conveying an indication of a type of said interrupt.

4. A secure execution mode-capable processor comprising:
   execution logic configured to execute instructions; and
   exception logic coupled to said execution logic and configured to:
   detect an interrupt;
   cause said execution logic to perform a predetermined routine in response to detecting said interrupt;
   cause said execution logic to perform a second routine prior to performing said predetermined routine in response to detecting said interrupt is an INIT interrupt depending upon whether processor features associated with a secure execution mode are enabled; and
   clear a trusted memory area, and disable the secure execution mode features in response to detecting said interrupt is an INIT interrupt, and determining that said secure execution mode features are enabled.

5. The secure execution mode-capable processor as recited in claim 4, wherein said second routine includes calling a secure exception handler.

6. The secure execution mode-capable processor as recited in claim 5, wherein calling said secure exception handler includes conveying an indication of a type of said interrupt.

7. A system comprising:
   a system memory including a plurality of addressable locations; and
   a secure execution mode-capable processor coupled to said system memory and configured to operate in a trusted execution mode, said secure execution mode-capable processor comprising:

execution logic configured to execute instructions; and exception logic coupled to said execution logic and configured to:

detect an interrupt;

cause said execution logic to perform a predetermined routine in response to detecting said interrupt; and cause said execution logic to perform a second routine prior to performing said predetermined routine in response to detecting said interrupt is an INIT interrupt depending upon whether processor features associated with a secure execution mode are enabled; and clear a trusted memory area, and disable the secure execution mode features in response to detecting said interrupt is an INIT interrupt, and determining that said secure execution mode features are enabled.

8. The system as recited in claim 7, wherein said second routine includes calling a secure exception handler.

9. The system as recited in claim 8, wherein calling said secure exception handler includes conveying an indication of a type of said interrupt.

* * * * *